March 8, 1966     P. Y. A. F. SANDRÉ     3,238,716
COMBINED TURBOJET-RAMJET UNITS
Filed June 7, 1962
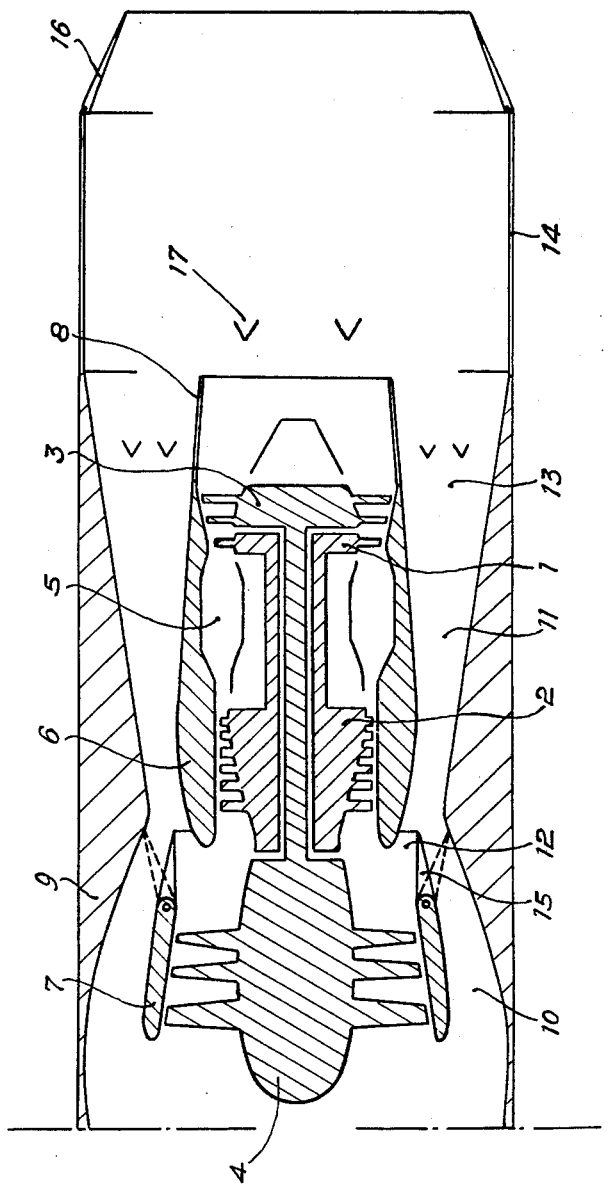
Inventor:
Pierre Yves Aimable Fernand Sandre + # United States Patent Office 3,238,716
Patented Mar. 8, 1966

3,238,716
COMBINED TURBOJET-RAMJET UNITS
Pierre Yves Aimable Fernand Sandré, Chatillon-sous-Bagneux, France, assignor to Nord-Aviation Societe Nationale de Constructions Aeronautiques, Paris, France, a joint-stock company of France
Filed June 7, 1962, Ser. No. 200,789
Claims priority, application France, Mar. 15, 1962,
891,219
6 Claims. (Cl. 60—35.6)

The present invention relates to improvements in combined turbojet-ramjet units.

It is known that in a conventional turbo-fan, the total outlet pressure of the primary flux diminishes much more rapidly than the total pressure of the secondary flux when the Mach number of flight increases. These total pressures are generally of the same order at low speeds of flight, but become very different at high Mach values.

This phenomenon is not troublesome when the turbo-fan is mounted in such manner that no interaction can take place between the two fluxes which it discharges. Thus, in the case of the turbo-fan-ramjet combination, it is possible to eliminate all risk of interaction by locating the outlets of the two fluxes in zones in which the surrounding static pressure is alway sufficiently low for these outlets to remain sonic. As regards the primary flux, it may be necessary to seek the appropriate depression very far on the downstream side, sometimes even beyond the outlet throat of the ramjet. The discharge nozzle is then heavy and difficult to protect from the hot gases of the ramjet which surround it.

It is therefore advantageous to reduce the length of this nozzle. However, the primary flux is then discharged in a zone at high pressure, and it can no longer be sonic at the outlet of the nozzle of the turbo-fan. The interaction referred to above is therefore inevitable.

It is always possible to define the outlet section of the turbo-fan nozzle so that it functions under the best conditions at low speeds of flight. At high speeds of flight however it is not possible to maintain the correct operation which is obtained in the absence of interaction, since the considerable difference between the total pressures of the two flows would make it impossible to obtain equilibrium of the static pressures at the outlet of the turbo-fan nozzle. The operation of the turbo-fan will thus be very considerably disturbed, and it will be very difficult to operate the low-pressure compressor under good conditions.

It may also be envisaged to provide the turbo-fan nozzlze with a device permitting its outlet section to be varied, but this solution is complicated, and it is furthermore not certain that it would be sufficient to ensure correct operation at very high flight Mach numbers.

In consequence, the present invention has for its object to overcome these drawbacks and its purpose consists essentially in modifying the by-pass ratio of the turbo-fan, thereby causing a variation of the ratio of the total outlet pressures of the primary flux and the secondary flux of the turbo-fan.

The invention is applicable to combined turbojet-ramjet units of the kind in which the turbojet is a turbo-fan, the secondary flux of the turbo-fan is discharged in its entirety into the intake duct of the direct flux of the ramjet, and the discharge-nozzle of the turbo-fan discharges into the interior of the rear portion of the combined unit, the said combined units comprising means for regulating the outlet section of the secondary flux in the intake duct of the direct flux of the ramjet, these means being adapted to operate at will between two limiting positions, the first in which said intake duct is completely closed and the second in which said outlet of secondary flux is completely closed.

The improvements according to the invention are essentially characterized in that the turbo-fan has two rotors, a low-pressure rotor and a high-pressure rotor, the compressor of the said low-pressure rotor being wholly traversed by the whole of the flux supplying the turbo-fan, and the distribution between the primary flux and the secondary flux of the turbo-fan being affected at the outlet of the low-pressure compressor, the outlet of the common exit nozzle comprising means for regulating its outlet section; the outlet of the discharge nozzle for the primary flux of the turbo-fan is not provided with regulating means and is located in a zone of the rear portion of the combined unit which is definitely on the upstream side of the outlet of this latter, and an after-burning device may be installed in the primary flux discharged from the turbo-fan, on the downstream side of the outlet of the discharge nozzle of this latter.

The combined turbojet-ramjet units, improved according to the invention, have the following advantages:

Elimination of the portion of the discharge nozzle of the primary flux which is surrounded by the hot gases of the ramjet, resulting in a simplification of the unit structure, an increase in its life and a reduction of its weight.

Increase of the thrust induced by the after-burning in the primary flux.

Maintenance of the optimum adaptation of the turbo-fan under all conditions of flight, by virtue of the possibility of regulation; of the direct flux of the ramjet; of the by-pass ratio of the turbo-fan.

Possibility for the unit to pass in a continuous manner from operation as a pure turbo-fan to operation as a pure ramjet.

One form of embodiment of the invention is described below with reference to the single figure of the accompanying drawing which shows a longitudinal section of the combined unit.

In the drawing, the high-pressure rotor comprises the turbine 1 and the compressor 2, while the low-pressure rotor comprises the turbine 3 and the compressor 4. Combustion chambers 5 are arranged in the interior of the main casing 6 of the turbo-fan. A front casing 7 surrounds the low-pressure compressor 4. The discharge nozzle 8 of the main casing 6 has a constant outlet section in a zone which is considerably upstream of the common exit nozzle 14 of the combined unit.

The combined unit is enclosed by an external casing 9. Between this outer casing and the casings 7 and 6 of the turbo-fan, are formed the inlet duct 10 of the direct flux of the ramjet and the duct 11 supplying the annular combustion chamber 13. The rear portion of the casing 9 forms the common exit nozzle 14, the outlet section of which can be controlled by the flaps 16.

Flaps 15 articulated on the rear portion of the front casing 7 of the turbo-fan control the outlet section of the passage 12 for the secondary flux of the turbo-fan towards the duct 11, between the front casing 7 and the rear casing 6. In their extreme position, the flaps 15 can close either the annular duct 10 of the ramjet or the annular passage 12 between the front casing 7 and the rear casing 6 of the turbo-fan.

The operation of the combined turbojet-ramjet unit improved according to the invention is as follows:

It is assumed that the combined unit is in the conditions of flight at high speed. If a pre-determined speed has been given to the high-pressure rotor, for example its maximum speed of rotation, this rotor absorbs a definite rate of flow.

If now the speed of rotation of the low-pressure rotor is progressively reduced, the output supplied by the low-pressure compressor 4 diminishes, together with its compression ratio. The flow rate of secondary flux of the turbo-fan discharged through the passage 12 is also reduced, since the high-pressure compressor 2 always absorbs the same flow-rate. The total pressure diminishes in the passage 12 and in consequence, for a given flow-rate of the ramjet, there is a reduction of the total pressure of the mixture in the duct 11.

Simultaneously, the power required for driving the low-pressure compressor 4 is reduced; this results in a reduction of the pressure drop in the turbine 3 and an increase in the total pressure in the discharge nozzle 8.

The reduction of the speed of rotation of the low-pressure rotor has therefore the effect of reducing the difference between the total pressures in the discharge nozzle 8 and the duct 11. This reduction of speed is obtained very simply by reducing the outlet section of the passage 12 by acting on the flaps 15. It will be a simple matter to determine the position of the flaps 15 which corresponds to a balance of the static pressures at the outlet of the nozzle 8. The regulation of the control of the flaps 15 may be designed in such manner as to keep the point of operation of the low-pressure compressor 4 on the optimum line. The outlet section of the common exit nozzle 14 is then adapted to the total rate of flow, taking account of the heating in the chamber 13, by adjustment of the flaps 16.

The reduction of the outlet section of the passage 12 results in an increase of the outlet section of the duct 10. It is thus possible to increase the flow rate of the ramjet which is finally controlled by the flaps 16. The increase of the flow rate of the ramjet accentuates the reduction of the total pressure in the duct 11, and facilitates the balancing of the static pressures.

It should be observed that the variation of the bypass ratio of the turbo-fan, which is the basis of the operation described here, is only easy because the separation of the two flows is effected at the outlet of the low-pressure compressor 4. It would not be the same if this separation were made between two stages of the compressor 4.

It has been seen that the primary flux is subsonic at the outlet of the discharge nozzle 8. If the dimensions of the outlet sections are suitably chosen, the speed of this primary flux could even be sufficiently low for it to be possible to install a re-heat device 17 on the downstream side of this outlet.

It should finally be noted that the combined turbo-fan-ramjet unit described above operates as a pure turbo-fan when the flaps 15 completely close the duct 10. It then has all the advantages of the conventional turbo-fan at low speeds of flight. Similarly, at very high Mach numbers, the propulsion unit can operate as a pure ram-jet, the turbo-fan being cut-off. The flaps 15 are then placed in the position of complete closure of the passage 12. The outlet section of the duct 10 is then opened to the maximum extent for the passage of the ramjet flux.

I claim:

1. A combined turbojet-ramjet comprising, in combination
    (a) a ramjet having a direct air stream intake duct provided with an air intake opening,
    (b) a turbofan having a low pressure rotor including a low pressure compressor and a high pressure rotor including a high pressure compressor, said turbofan being mounted concentrically in said ramjet and having
    (c) an air intake opening downstream of the air intake opening of said ramjet,
    (d) an outlet nozzle for said ramjet,
    (e) an outlet nozzle for said turbofan,
    (f) the end of the outlet nozzle of said turbofan being of constant cross-section and being located a distance upstream of the end of the outlet nozzle of the ramjet, so that the outlet nozzle of the ramjet becomes the outlet nozzle of the combined jet engine,
    (g) a main casing for the turbofan having
    (h) a passageway communicating the outlet of the low pressure compressor with said intake duct so that the whole of the secondary air stream of said turbofan can flow into the intake duct for the direct air stream of said ramjet,
    (i) said passageway being located between the low pressure compressor and the high pressure compressor,
    (j) first means for regulating the cross-sectional area of the outlet section of said passageway to said intake duct for said direct air stream to said ramjet, said means having one limiting position in which it completely opens said outlet section of the passageway to said intake duct and completely shuts off said ramjet air intake opening from said intake duct and a second position in which it can completely obstruct the outlet section of said passageway to prevent air from the low pressure compressor flowing into said intake duct, and
    (k) second means for regulating the outlet section of said outlet nozzle of said ramjet.

2. A combined turbojet-ramjet as claimed in claim 1, wherein said ramjet air intake opening is free of any compressor so that the ramjet air is not subject to any losses due to passing through a compressor when the turbofan is not in use and the ramjet only is operating.

3. A combined turbojet-ramjet as claimed in claim 1, wherein said first means comprises
    (1) flaps articulated on said main casing.

4. A combined turbojet-ramjet as claimed in claim 3, wherein said flaps are articulated at the upstream edge of said passageway of said main casing and extend downstream therefrom.

5. A combined turbojet-ramjet as claimed in claim 1, wherein said second means comprises
    (1) flaps articulated on the downstream end of said outlet nozzle of the ramjet.

6. A combined turbojet-ramjet as claimed in claim 1, wherein an after-burning device is located in the primary flux discharged from said turbofan on the downstream side of the outlet of said turbofan outlet nozzle.

References Cited by the Examiner

UNITED STATES PATENTS

| 2,896,408 | 7/1959 | O'Donnell | 60—35.6 X |
| 2,952,973 | 9/1960 | Hall et al. | 60—35.6 |
| 2,955,414 | 10/1960 | Hausmann | 60—35.6 |

FOREIGN PATENTS

| 704,669 | 2/1954 | Great Britain. |
| 243,957 | 2/1947 | Switzerland. |

MARK NEWMAN, *Primary Examiner.*

JULIUS E. WEST, SAMUEL LEVINE, *Examiners.*

S. N. GARBER, D. HART, *Assistant Examiners.*